United States Patent [19]

Buske

[11] Patent Number: 4,745,981

[45] Date of Patent: May 24, 1988

[54] HYDRAULIC IMPACT TOOL

[75] Inventor: Robert J. Buske, Corsicana, Tex.

[73] Assignee: Consolidated Technologies Corp., Denver, Colo.

[21] Appl. No.: 760,389

[22] Filed: Jul. 30, 1985

[51] Int. Cl.[4] .............................................. B23B 45/16

[52] U.S. Cl. .................................... 173/119; 173/134; 91/321

[58] Field of Search ............... 173/119, 115, 134, 125, 173/112; 91/25, 321

[56] References Cited

U.S. PATENT DOCUMENTS

| | | | |
|---|---|---|---|
| 640,728 | 8/1884 | Buske . | |
| 3,687,008 | 8/1972 | Densmore | 91/25 |
| 3,838,741 | 10/1974 | Pepe | 173/115 |
| 4,231,434 | 11/1980 | Justus | 173/119 |
| 4,479,551 | 10/1984 | Justus | 173/119 |

OTHER PUBLICATIONS

U.S. Ser. No. 640,728 filed Aug. 1984, Buske.

*Primary Examiner*—E. R. Kazenske
*Assistant Examiner*—Willman Fridie, Jr.
*Attorney, Agent, or Firm*—Gunn, Lee & Jackson

[57] ABSTRACT

A hydraulic impact tool having a housing, a working tool, a ram, an energy storage device, and a valve slide. The tool also has a high pressure hydraulic fluid inlet port, an intermediate pressure hydraulic fluid inlet port, and two return lines. One of the return lines is for exhausting fluid from an upper annular chamber, and the other return line is for exhausting fluid from an intermediate annular chamber.

5 Claims, 4 Drawing Sheets

HYDRAULIC IMPACT TOOL

BACKGROUND OF THE INVENTION

1. Field of the Invention

This invention relates in general to hydraulic tools, and in particular to tools for converting energy into a series of rapid, high energy impact blows.

2. Description of the Prior Art

Hydraulic impact tools generally have an energy storage device, such as a coil spring or gas spring, a ram, and a working tool. The energy storage device causes the ram to accelerate to deliver a blow to the working tool. Impact tools are normally used for demolition purposes, such as breaking concrete, pavement, or ice, or for cutting asphalt. These tools can also be used for other jobs, such as compacting soil or driving pipe, posts, or pilings.

One type of impact tool is described in U.S. Pat. No. 4,231,434 (Justus), issued Nov. 4, 1980. In that tool, the ram has a piston portion, which sealingly engages a sleeve to define a piston. Hydraulic pressure pushes the defined piston away from the working tool, to cock the ram, and to store energy by compressing a gas spring. At the top of the stroke, the piston portion of the ram separates from the sleeve, and the ram is accelerated to impact by the gas spring. A coil spring initiates downward movement of the sleeve, and hydraulic pressure returns the sleeve to sealing engagement with the piston portion of the ram.

U.S. patent application Ser. No. 640,728, filed Aug. 14, 1984, shows a hydraulic impact tool having a housing, a working tool, a ram, an energy storage device, and a valve slide. The tool also has a high pressure fluid inlet port, an intermediate pressure fluid inlet port, and a single return line fluid outlet port. The return line fluid outlet is for exhausting fluid from both the upper and intermediate annular chambers in the tool. The tool also has a flow restriction means for restricting the flow of hydraulic fluid between the ram and the valve slide while the ram is moving toward the working tool.

SUMMARY OF THE INVENTION

It is the general object of this invention to provide an improved impact tool, in which the higher pressure delatch fluid pressure is not exhausted into the standard return line. This object is accomplished by the provision of two separate return line fluid outlet ports.

The first port exhausts the higher flow return volume from the upper annular chamber. The second port is for exhausting the higher pressure delatch volume from the intermediate annular chamber.

DESCRIPTION OF THE PREFERRED EMBODIMENT

Figure 1A:
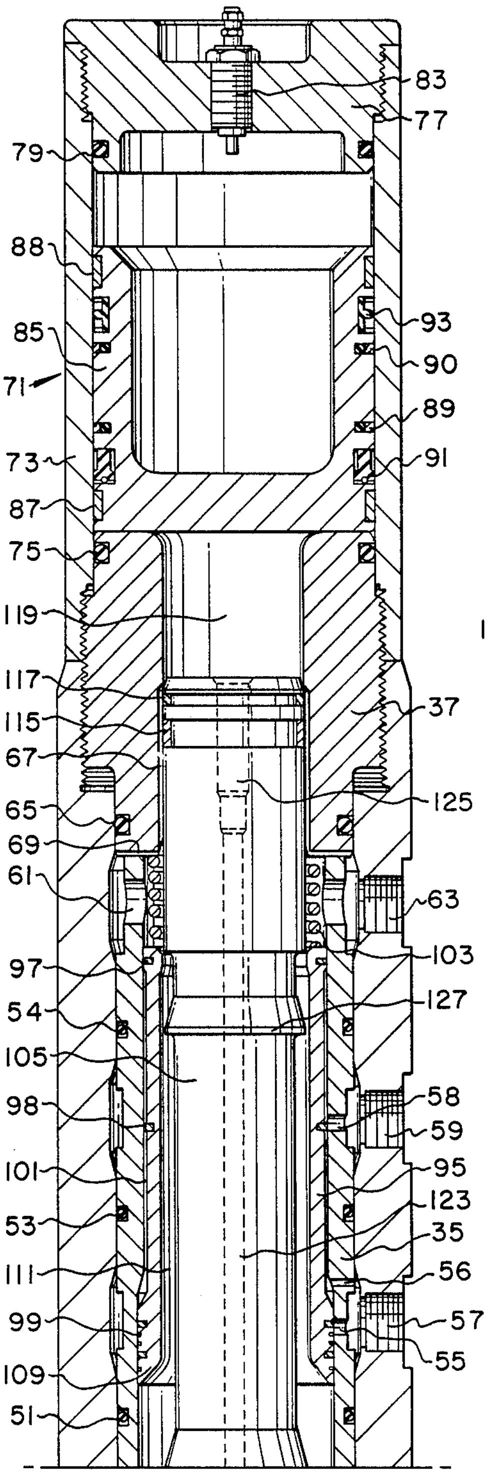
FIGS. 1A and 1B are a sectional view of an impact tool at the moment of impact.
Figure 1B:
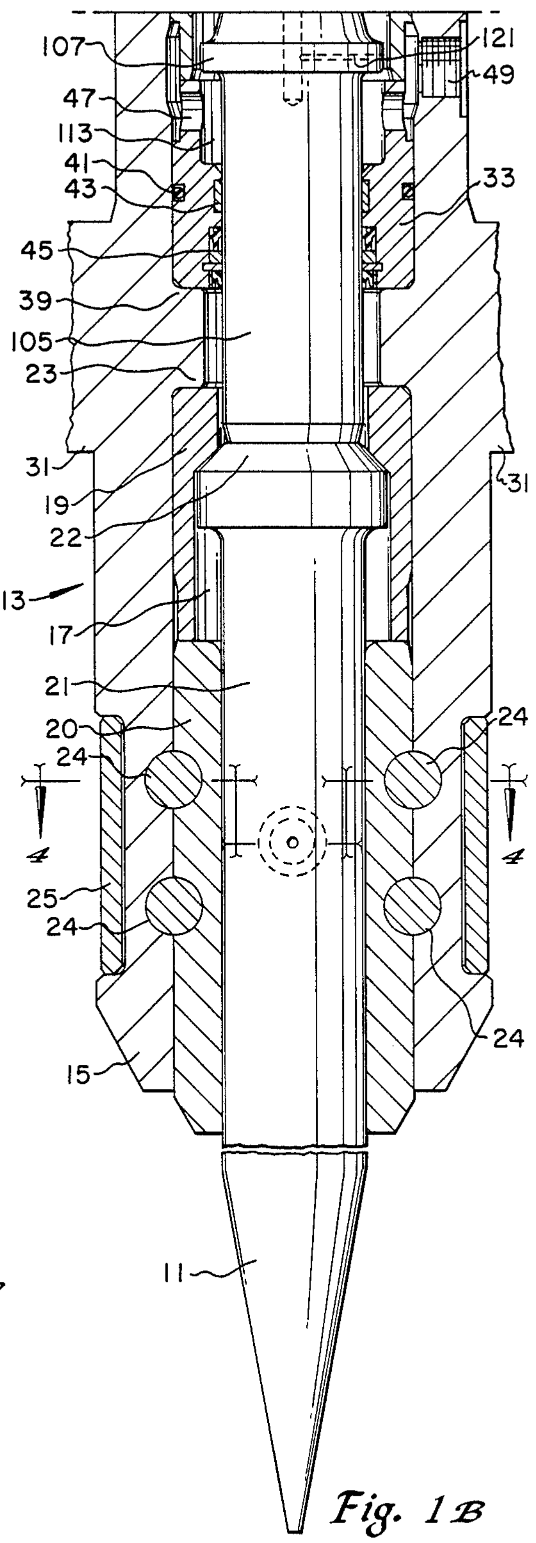
Figure 2A:
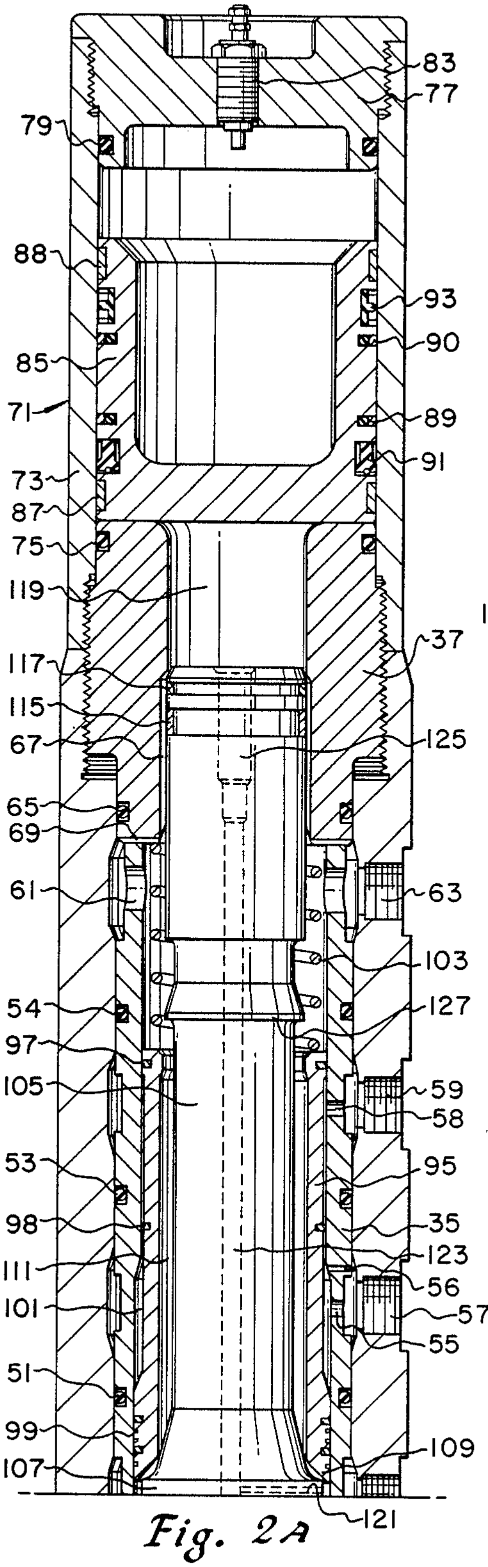
FIGS. 2A and 2B are a sectional view of an impact tool at the end of the dwell time.
Figure 2B:
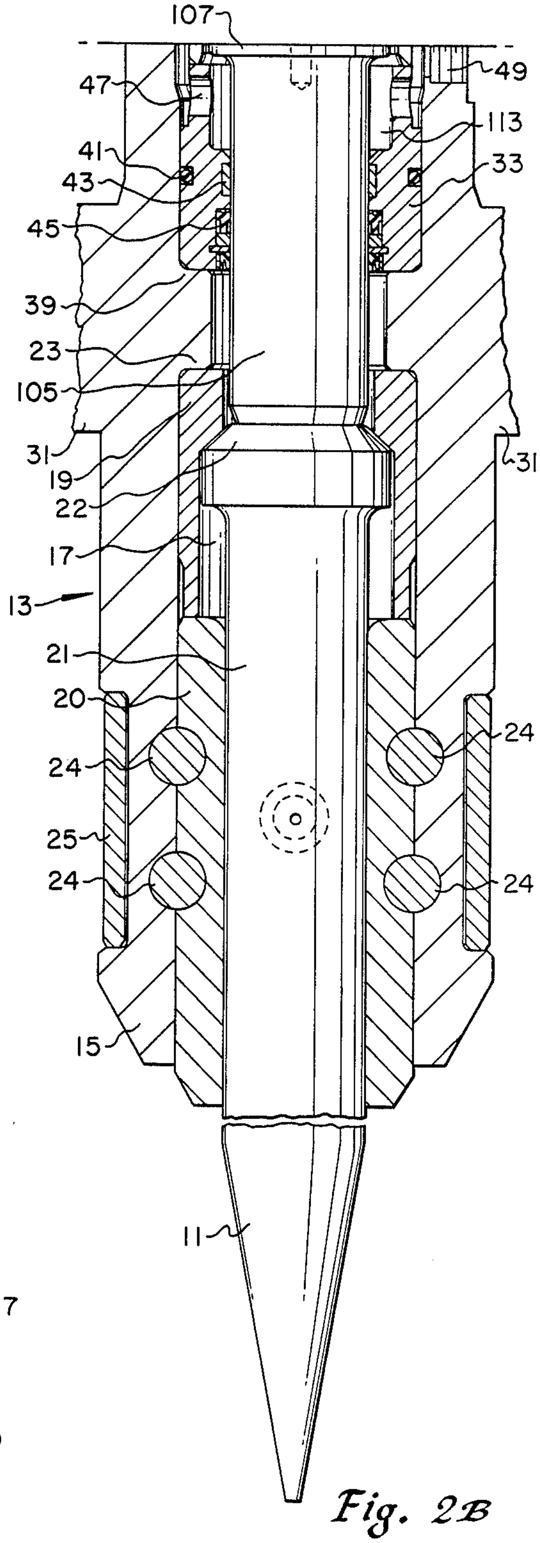
Figure 3A:
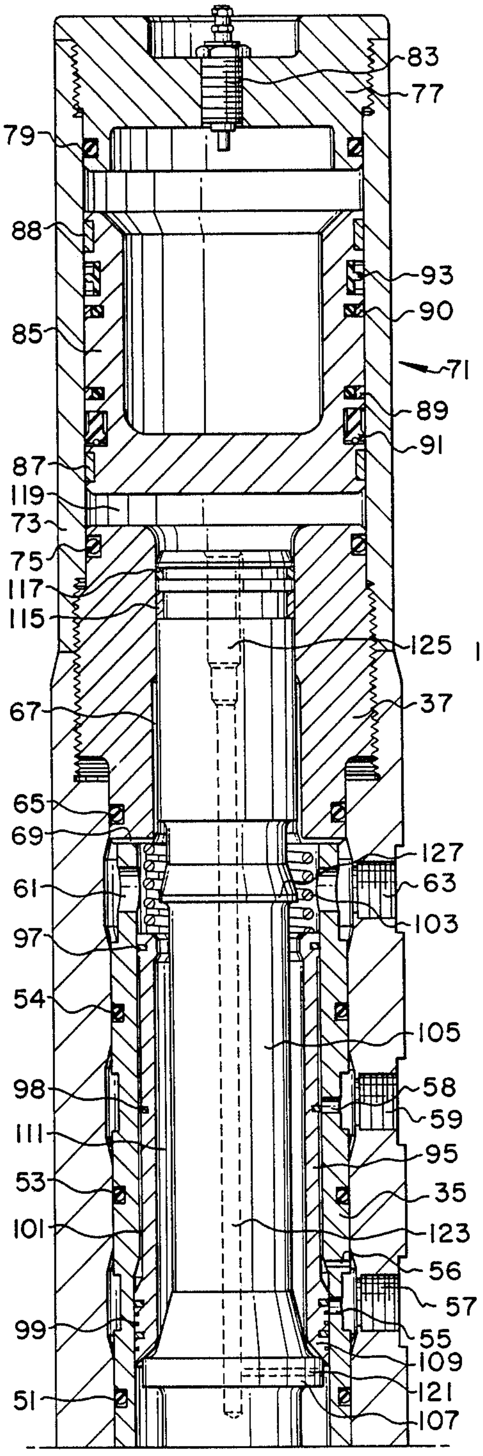
FIGS. 3A and 3B are a sectional view of an impact tool immediately prior to firing.
Figure 3B:
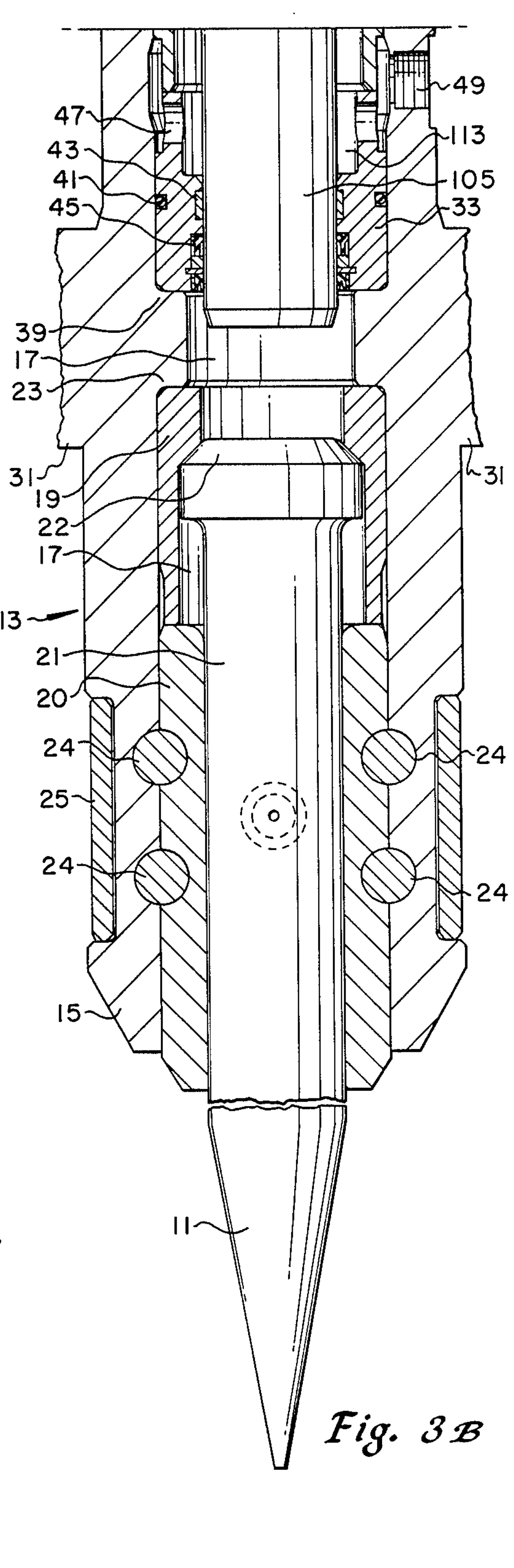

In FIGS. 1B, 2B, and 3B, a typical working tool 11 is shown mounted in the housng 13 of the hydraulic impact tool. Typical working tools may be moils, tampers, spades, or post drivers. The housing 13 has an outer casing 15, which has a generally cylindrical bore 17.

The working tool 11 is mounted in the housing 13 by first inserting a preload bushing 19 into the bore 17 of the casing 15. A tool guide 20 is placed around the shaft 21 of the working tool 11, and the working tool 11 is inserted into the bore 17 of the casing 15, until a knob 22 on the top of the working tool 11 contacts the preload bushing 19 and the preload bushing 19 contacts a shoulder 23 in the casing 15.

Figure 4:
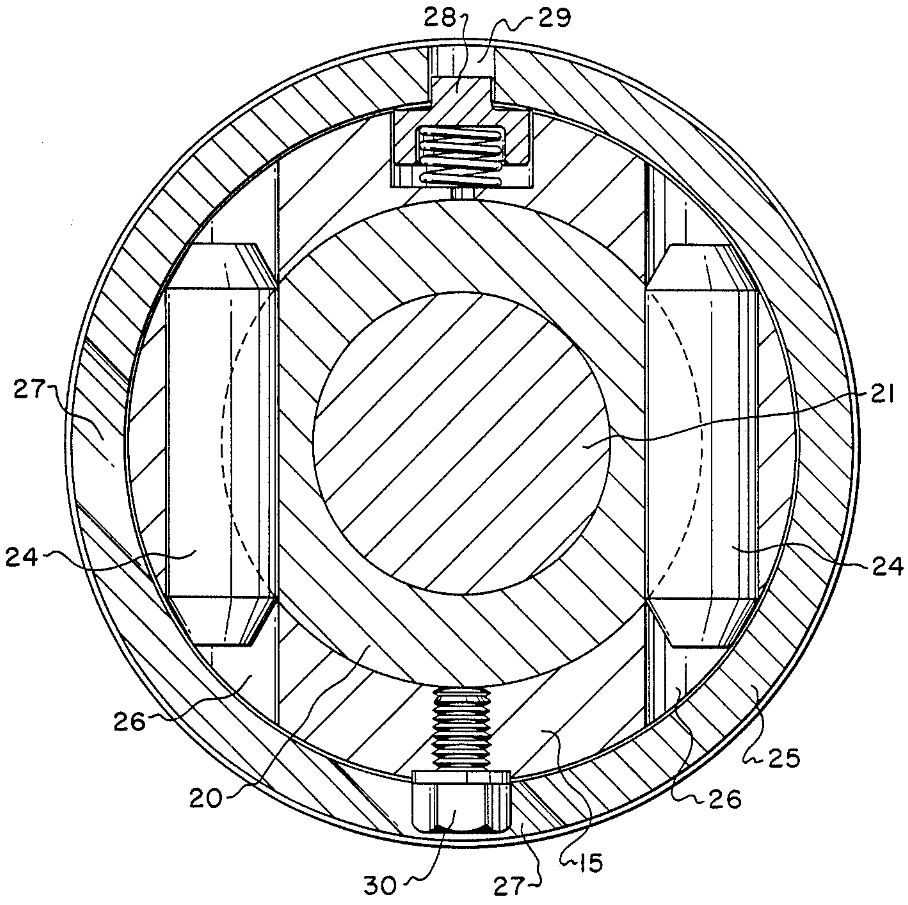
FIG. 4 is a sectional view of an impact tool along the lines 4—4 in FIG. 1.

The entire assembly is then secured by four tool retainer pins 24 and a pin retainer ring 25. The retaining means is best illustrated in FIG. 4. First, the pin retaining holes 26 in the casing 15 and grooves in the tool guide 20 are aligned. Then, the pin retainer ring 25 is rotated until the pin insertion holes 27 are aligned with the pin retaining holes 26 on one side of the tool. Two of the retaining pins 24 are then inserted. The pin retainer ring 25 is then rotated until the pin insertion holes 27 are aligned with the pin retaining holes 26 on the other side of the tool. Then, the remaining two retaining pins 24 are inserted into the retaining holes 26.

When all four retaining pins 24 have been installed, the retainer ring 25 is rotated to the position shown in FIG. 4. When the retainer ring 25 reaches this position, a spring-loaded plunger 28, mounted within the casing 15, locks within a hole 29 in the retainer ring 25 to secure the retainer ring 25 against rotation. If desired, a locking bolt 30 can then be inserted through the pin insertion hole 27, and threaded into the casing 15, to additionally secure the retainer ring 25 to the casing 15.

The casing 15 also has a pair of attachment flanges 31. These attachment flanges 31 are connected to adapter plates (not shown), which are used to attach the impact tool to a tractor-backhoe, excavator, or other similar vehicle. The casing 15 and the flanges 31 may be integral if made from a casting or the like.

In addition to the casing 15, the housing 13 also has three generally cylindrical sleeves: a lower sleeve 33, a middle sleeve 35, and an upper sleeve 37. The lower sleeve 33, shown in FIGS. 1B, 2B, and 3B, abuts a shoulder 39 in the casing 15. An O-ring seal 41 seals between the lower sleeve 33 and the casing 15. A wear ring 43 and a seal assembly 45 are located in grooves on the inner circumference of the lower sleeve 33. The seal assembly 45 consists of a seal, a backup ring, a retaining ring, and a rod wiper.

A plurality of ports 47 allow fluid passage through the lower sleeve 33. A hydraulic line (not shown) is attached to the impact tool at a hydraulic fluid inlet 49. Hydraulic fluid, at an intermediate pressure, is thus supplied to the bore 17 of the casing 15 through the ports 47 in the lower sleeve 33.

As seen in FIGS. 1A, 2A, and 3A, the middle sleeve 35 has three O-ring seals 51, 53, 54, which seal between the middle sleeve 35 and the casing 15. One or more ports 55 allow fluid flow through the middle sleeve 35, between the lower two of these O-ring seals 51, 53. The middle sleeve 35 also has a bleed orifice hole 56, above the ports 55. A second hydraulic fluid inlet 57 allows fluid pressure at a high pressure to be supplied to the bore 17 of the casing 15, through the port or ports 55.

Another port, or a plurality of ports 58, allows fluid to flow through the middle sleeve 35, between the upper two O-ring seals 53, 54. A return line (not shown) is attached to the impact tool at a hydraulic fluid outlet 59 to exhaust fluid from within the middle sleeve 35, between the upper two O-ring seals 53, 54.

Above the three O-ring seals 51, 53, 54, a plurality of ports 61 allow fluid to flow through the middle sleeve 35, and out a return line (not shown), which is attached to the impact tool at a hydraulic fluid outlet 63. Hydraulic fluid is thus exhausted from the bore 17 of the casing 15, through the ports 61 and the fluid outlet 63.

The upper sleeve 37 is threaded into the upper end of the casing 15. The upper sleeve 37 abuts the middle sleeve 35 and locks the middle sleeve 35 and the lower sleeve 33 in place. An O-ring seal 65 seals between the upper sleeve 37 and the casing 15. The upper sleeve 37 has a plurality of vertical slots 67, and a plurality of horizontal slots 69, which provide for fluid flow between the vertical slots 67 and the hydraulic fluid outlet 63.

An energy storage device 71 is mounted in the upper end of the hydraulic impact tool. This device may be a coil spring or a gas spring, but in the preferred embodiment the energy storage device is a hydraulic actuator 71. The actuator 71 has an outer cylinder 73, which is threaded onto the upper sleeve 37, until the outer cylinder 73 abuts the casing 15. An O-ring seal 75 seals between the cylinder 73 and the upper sleeve 37. A cap 77 is threaded into the top of the cylinder 73, and an O-ring seal 79 seals between the cap 77 and the inner circumference of the cylinder 73.

A gas, such as nitrogen, is injected into the upper end of the cylinder 73 through a filler valve 83 in the cap 77. A cup-shaped piston 85 is reciprocally located within the cylinder 73. The piston 85 has a pair of wear rings 87, 88, a pair of piston rings 89, 90, and a pair of seals 91, 93 between the piston 85 and the inner circumference of the cylinder 73. The piston 85 thus separates the gas in the upper end of the cylinder 73 from the hydraulic fluid in the lower end of the cylinder 73.

A valve slide 95 is located in the bore 17 within the middle sleeve 35. The valve slide 95 is reciprocal between a lower position, shown in FIG. 2A, and an upper position, which is slightly higher than the position shown in FIGS. 1A and 3A. In the mid-portion of the valve slide 95, the outside diameter of the valve slide 95 is smaller than the inside diameter of the middle sleeve 35. At each end, however, the outer circumference of the valve slide 95 is sealed against the inner circumference of the middle sleeve 35. The valve slide 95 has a piston ring 95 at the upper end, a piston ring 98 in the middle, and a seal 99 at the lower end. The lower seal 99 may consist of a piston ring, or labyrinth grooves, or a combination of both piston rings and labyrinth grooves. An intermediate annular chamber 101 is thus formed between the valve slide 95 and the middle sleeve 35. When the valve slide 95 is in its lower position, shown in FIG. 2A, the intermediate annular chamber 101 is opened to the port or ports 55 and the fluid inlet 57.

When the valve slide 95 is in its upper position, the piston ring 98 on the valve slide 95 reaches the ports 58, and the intermediate annular chamber is opened to the fluid outlet 59. Also, a coil spring 103 is compresses between the valve slide 95 and the upper sleeve 37, when the valve slide 95 is its upper position.

A spool, or ram 105, is located within the bore 17 of the impact tool. The ram 105 is reciprocal between a lower position, shown in FIGS. 1A and 2A, and an upper position, shown in FIG. 3A. When the ram reaches the lower position, the bottom of the ram 105 strikes the top of the working tool 11. The outside diameter of the lower end of the ram 1055 is equal to the inside diameter of the wear ring 43 and the seal assembly 45 on the lower sleeve 33. The seal assembly 45 thus seals between the ram 105 and the lower sleeve 33.

The ram 105 has a piston portion 107, which has a larger diameter than the rest of the ram 105. The diameter of the piston portion 107 is larger than the inside diameter of the valve slide 95, but smaller than the inside diameter of the middle sleeve 35. The valve slide 95 has a lower sealing portion 109 for sealingly engaging the piston portion 107 of the ram 105. Above the piston portion 107, the diameter of the ram 105 decreases to a diameter which is less than the inside diameter of the valve slide 95, forming an upper annular chamber 111 between the ram 105 and the valve slide 95. When the valve slide 95 and the ram 105 are sealingly engaged, the bore 17 is thus divided into three annular chambers: the upper annular chamber 111, the intermediate annular chamber 101, and a lower annular chamber 113, which is between the ram 105 and the lower sleeve 33.

At the upper end of the ram 105, the diameter of the ram 105 increases to a diameter which is equal to the inside diameter of the upper sleeve 37. The ram 105 has a wear ring 115 to maintain the diameter, and a piston ring 117 to seal between the ram 105 and the inner circumference of the upper sleeve 37. A sealed chamber 119 is thus formed between the top of the ram 105 and the bottom of the piston 85. However, when the ram is in its lower position, as shown in FIGS. 1 and 1A, the piston ring 117 reaches the vertical slots 67, and the chamber 119 is opened to fluid contact with the verical slots 67, the horizontal slots 69, and the fluid outlet 63.

A small hole 121 in the piston portion 107 of the ram 105 leads from the lower annular chamber 113 to a duct 123, which extends up the center of the ram 105 to an orifice 125. The orifice 125 allows hydraulic fluid from the lower annular chamber 113 to replenish the hydraulic fluid in the chamber 119.

Within the valve slide 95, the ram 105 has a shoulder portion 127 with a larger diameter. The diameter of the shoulder portion 127 is only slightly smaller than the inside diameter of the valve slide 95. In some embodiments, the valve slide 95 may have a section with a smaller inside diameter, which will pass the shoulder portion 127 during the operation of the impact tool.

The operation of the impact tool will be described starting with the ram 105 and the valve slide 95 in their lowermost positions, as shown in FIGS. 2A and 2B. High pressure hydraulic fluid is injected through the fluid inlet 57, and the ports 55, to the intermediate annular chamber 101. The fluid pressure forces the valve slide 95 downward into sealing engagement with the piston portion 107 of the ram 105.

At the same time, intermediate pressure hydraulic fluid is injected through the fluid inlet 49, and the ports 47, into the lower annular chamber 113. Since the intermediate pressure fluid is acting against a larger area than the high pressure fluid, the ram 105 and the valve slide 95 are forced upward, away from the working tool 11.

As the ram 105 moves upward, the hydraulic fluid in the chamber 119 pushes upward on the piston 85, compressing the nitrogen in the upper portion of the cylinder 73. Since the area of the piston 85 is four times larger than the area of the top of the ram 105, the piston 85 will only move one-fourth the distance that the ram 105 moves. As the valve slide 95 approaches the top of its travel, the valve slide 95 compresses the coil spring 103.

When the ram 105 and the valve slide 95 have reached the position shown in FIGS. 3A and 3B, the piston ring 97 reaches one or more of the slots or holes 61, and loses sealing engagement with the middle sleeve 35. At approximately the same time, the lower end of the valve slide 95 covers the port or ports 55 to the fluid inlet 57. The intermediate annular chamber 101 is opened to the return line through fluid outlet 59.

Since the intermediate chamber 101 is now open to the outlet 59, there is no longer any high pressure fluid exerting a downward force on the valve slide 95, and the valve slide 95 jumps upward, breaking the sealing engagement with the piston portion 107 of the ram 105. When the sealing engagement between the valve slide 95 and the ram 105 is broken, the lower annular chamber 113 is opened to fluid contact with the upper annular chamber 111. The upward force on the piston portion 107 is greatly reduced, and the fluid actuator 71 forces the ram 105 downward until the ram 105 strikes the working tool 11. The fluid actuator 71 is thus an energy storage means for accelerating the ram 105 to deliver a blow to the working tool 11 when the ram 105 is released.

The time between impact and the restoration of sealing engagement between the valve slide 95 and the ram 105 is known as the dwell time. If the dwell time is decreased, the blow rate of the impact tool is increased. The purpose of the shoulder portion 127 is to begin the downward travel of the valve slide 95 at an earlier point in time. As the ram 105 travels to impact, hydraulic fluid must pass between the ram 105 and the valve slide 95. The shoulder portion 127 is a low restriction means for restricting the flow of hydraulic fluid between the ram 105 and the valve slide 95, as the ram 105 travels toward the working tool 11. The flow restriction causes a downward force against the valve slide 95, which begins the downward travel of the valve slide 95. Since the flow restriction acts earlier than the coil spring 103 the dwell time is reduced.

Because of the bleed orifice hole 56, there is always a high pressure path on the valve slide 95. Since this path is orificed, the fluid flow is restricted, and the valve slide can delatch from the piston portion 107 of the ram 105. However, the high pressure helps to reduce the dwell time, by placing a downward force on the valve slide 95.

In addition to the bleed orifice hole 56 and the shoulder portion 107 on the ram 105, the coil spring 103 also exerts a downward force on the valve slide 95. When the coil spring 103 has moved the valve slide 95 downward far enough, the piston ring 97 again makes sealing engagement with the middle sleeve 35. The slot 59 is sealed off, and the port 55 is opened to the intermediate annular chamber 101. The high pressure hydraulic fluid from the inlet 57 forces the valve slide 95 downward until sealing engagement is restored with the piston portion 107.

In addition to a reduced dwell time, the improved impact tool of the invention has several other significant advantages. The impact tool can be easily disassembled by unscrewing the energy storage device 71 and the upper sleeve 37. The middle sleeve 35, the lower sleeve 33, the valve slide 95, and the ram 105 can then be removed from the upper end of the casing 15. The working tool 11 is easily replaced from the lower end of the casing 15, as explained above. The duct 123 and the orifice 25 allow the hydraulic fluid in the chamber 119 to be circulated for cooling.

Since there are two fluid outlets 59, 63, the valve slide 95 does not have to simultaneously shut off port 55 and open port 58. Therefore, tolerances do not have to be so close, and manufacturing costs are reduced. Also, since the two fluid outlets 59, 63 are separate, the tool can operate at a higher pressure on the return line at the upper outlet 63. This reduces the problems that some demolition tools have on backhoes that have high back pressure.

While the invention has been shown in only one of its forms, it should be apparent to those skilled in the art that it is not so limited, but is susceptible to various changes and modifications without departing from the spirit thereof.

I claim:

1. A hydraulic impact tool, comprising:

a housing, having a bore;

a working tool, one of the working tool being mounted within the bore;

a ram, reciprocally disposed within the housing, the ram having a piston portion having a diameter smaller than the diameter of the bore;

energy storage means for accelerating the ram to deliver a blow to the working tool when the ram is released;

a valve slide, reciprocally disposed around the ram, the valve slide having an upper sealing portion for sealingly engaging the circumference of the bore, the valve slide having a lower sealing portion for sealingly engaging the circumference of the bore and the piston portion of the ram, thereby dividing the bore into upper, intermediate, and lower annular chambers, and the valve slide having an inside diameter which is larger than the outside diameter of the ram;

a high pressure hydraulic fluid inlet port for supplying high pressure fluid to the intermediate annular chamber to force the lower sealing portion of the valve slide into sealing engagement with the piston portion of the ram;

an intermediate pressure hydraulic fluid inlet port for supplying intermediate pressure fluid to the lower annular chamber to force the ram and the valve slide away from the working tool when the ram and the valve slide are in sealing engagement;

a first return line hydraulic fluid outlet port for exhausting said intermediate pressure fluid from the upper annular chamber while said upper chamber is open to said lower chamber, thereby permitting said ram to be driven downwardly; and a second return line hydraulic fluid outlet port for exhausting said high pressure fluid from the intermediate annular chamber, thereby interrupting said sealing engagement of said valve slide and said ram, which causes said upper chamber to open to said lower chamber, such that said intermediate pressure hydraulic fluid inlet port need not be simultaneously closed to permit said ram to be driven downwardly, said fluid from said intermediate annular chamber being capable of being maintained at a different pressure than the fluid from said fluid from said upper annular chamber.

2. A hydraulic impact tool, comprising:

a housing, having a plurality of generally cylindrical sleeves secured within an outer casing, and a bore;

a working tool, one end of the working tool being mounted within the bore;

a ram, reciprocally disposed within the housing, the ram having a piston portion having a diameter smaller than the diameter of the bore;

energy storage means for accelerating the ram to deliver a blow to the working tool when the ram is released, the energy storage means being releasably secured to the uppermost of said sleeves, so that the energy storage means can be removed from the housing and the sleeves can be removed from the casing;

a valve slide, reciprocally disposed around the ram, the valve slide having an upper sealing portion for sealingly engaging the circumference of the bore, the valve slide having a lower sealing portion for sealingly engaging the circumference of the bore and the piston portion of the ram, thereby dividing the bore into upper, intermediate, and lower annular chambers, and the valve slide having an inside diameter which is larger than the outside diameter of the ram;

a high pressure hydraulic fluid inlet port for supplying high pressure fluid to the intermediate annular chamber to force the lower sealing portion of the valve slide into sealing engagement with the piston portion of the ram;

an intermediate pressure hydraulic fluid inlet port for supplying intermediate pressure fluid to the lower annular chamber to force the ram and the valve slide away from the working tool when the ram and the valve slide are in sealing engagement;

a first return line hydraulic fluid outlet port for exhausting fluid from the upper annular chamber; and a second return line hydraulic fluid outlet port for exhausting fluid from the intermediate annular chamber.

3. A hydraulic impact tool, comprising:

a housing, having a bore;

a working tool, one end of the working tool being mounted within the bore;

a ram, reciprocally disposed within the housing, the ram having a piston portion having a diameter smaller than the diameter of the bore;

energy storage means for accelerating the ram to deliver a blow to the working tool when the ram is released;

a valve slide, reciprocally disposed around the ram, the valve slide having an upper sealing portion for sealingly engaging the circumference of the bore, the valve slide having a lower sealing portion for sealingly engaging the circumference of the bore and the piston portion of the ram, thereby dividing the bore into upper, intermediate, and lower annular chambers, and the valve slide having an inside diameter which is larger than the outside diameter of the ram;

a high pressure hydraulic fluid inlet port for supplying high pressure fluid to the intermediate annular chamber to force the lower sealing portion of the valve slide into sealing engagement with the piston portion of the ram;

an intermediate pressure hydraulic fluid inlet port for supplying intermediate pressure fluid to the lower annular chamber to force the ram and the valve slide away from the working tool when the ram and the valve slide are in sealing engagement, the ram having a duct for supplying intermediate pressure fluid from the lower annular chamber to the energy storage means, said duct having a restricted flow controlled by an orifice;

a first return line hydraulic fluid outlet port for exhausting fluid from the upper annular chamber; and a second return line hydraulic fluid outlet port for exhausting fluid from the intermediate annular chamber.

4. A hydraulic impact tool, comprising:

a housing, having a plurality of generally cylindrical sleeves secured within an outer casing, and a bore;

a working tool, one end of the working tool being mounted within the bore;

a ram, reciprocally disposed within the housing, the ram having a piston portion having a diameter smaller than the diameter of the bore;

energy storage means for accelerating the ram to deliver a blow to the working tool when the ram is released, the energy storage means being releasably secured to the uppermost of said sleeves, so that the energy storage means can be removed from the housing and the sleeves can be removed from the casing;

a valve slide, reciprocally disposed around the ram, the valve slide having an upper sealing portion for sealingly engaging the circumference of the bore, the valve slide having a lower sealing portion for sealingly engaging the circumference of the bore and the piston portion of the ram, thereby dividing the bore into upper, intermediate, and lower annular chambers, and the valve slide having an inside diameter which is larger than the outside diameter of the ram;

a high pressure hydraulic fluid inlet port for supplying high pressure fluid to the intermediate annular chamber to force the lower sealing portion of the valve slide into sealing engagement with the piston portion of the ram;

an intermediate pressure hydraulic fluid inlet port for supplying intermediate pressure fluid to the lower annular chamber to force the ram and the valve slide away from the working tool when the ram and the valve slide are in sealing engagement, the ram having a duct for supplying intermediate pressure fluid from the lower annular chamber to the energy storage means, said duct having a restricted flow controlled by an orifice;

a first return line hydraulic fluid outlet port for exhausting fluid from the upper annular chamber; and a second return line hydraulic fluid outlet port for exhausting fluid from the intermediate annular chamber.

5. A hydraulic impact tool, comprising:

a housing, having a plurality of generally cylindrical sleeves secured within an outer casing, and a bore;

a working tool, one end of the working tool being mounted within the bore;

a ram, reciprocally disposed within the housing, the ram having a piston portion having a diameter smaller than the diameter of the bore;

energy storage means for accelerating the ram to deliver a blow to the working tool when the ram is released, the energy storage means being releasably secured to the uppermost of said sleeves, so that the energy storage means can be removed from the housing and the sleeves can be removed from the casing;

a valve slide, reciprocally disposed around the ram, the valve slide having an upper sealing portion for sealingly engaging the circumfernce of the bore, the valve slide having a lower sealing portion for sealingly engaging the circumference of the bore and the piston portion of the ram, thereby dividing the bore into upper, intermediate, and lower annular chambers, and the valve slide having an inside diameter which is larger than the outside diameter of the ram;

a high pressure hydraulic fluid inlet port for supplying high pressure fluid to the intermediate annular chamber to force the lower sealing portion of the valve slide into sealing engagement with the piston portion of the ram;

an intermediate pressure hydraulic fluid inlet port for supplying intermediate pressure fluid to the lower annular chamber to force the ram and the valve slide away from the working tool when the ram and the valve slide are in sealing engagement, the ram having a duct for supplying intermediate pressure fluid from the lower annular chamber to the energy storage means, said duct having a restricted flow controlled by an orifice;

a first return line hydraulic fluid outlet port for exhausting fluid from the upper annular chamber; and a second return line hydraulic fluid outlet port for exhausting fluid from the upper annular chamber; and a second return line hydraulic fluid outlet port for exhausting fluid from the intermediate annular chamber, said fluid from said intermediate annular chamber being capable of being maintained at a different pressure than the fluid from said upper annular chamber.

* * * * *